Feb. 11, 1969

L. M. JOHNSTON, JR 3,426,874

SELF-ENERGIZING SYNCHRONIZING CLUTCH

Filed Sept. 25, 1967

INVENTOR
LAWRENCE M. JOHNSTON, JR

Frederick J. Kunkel
ATTY

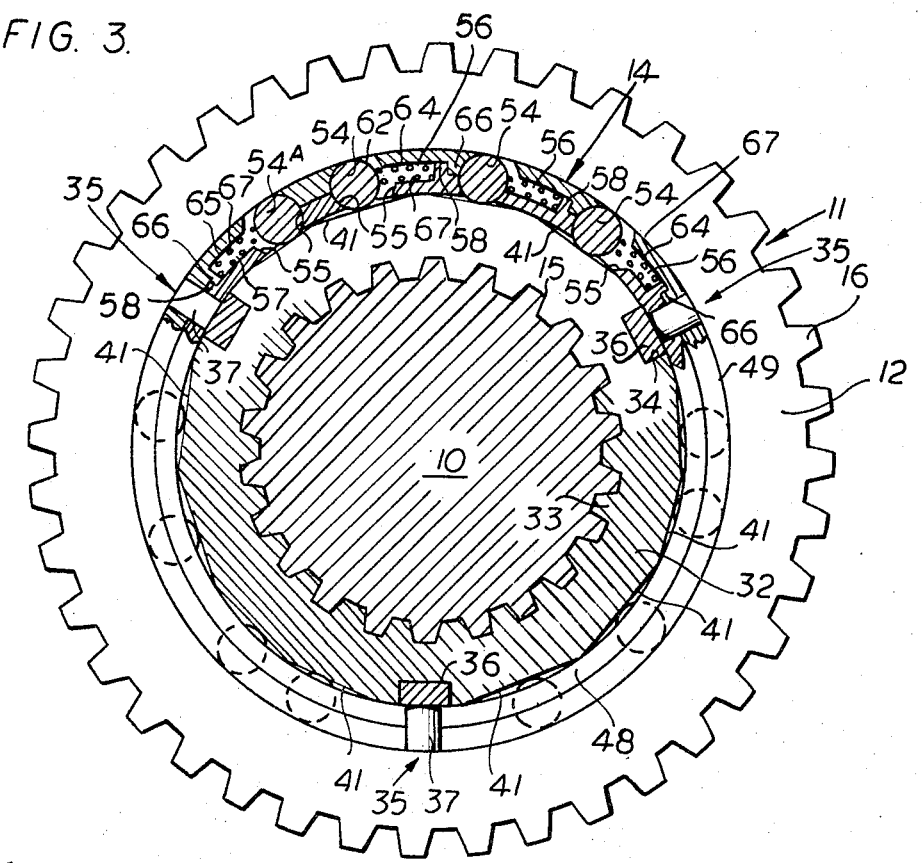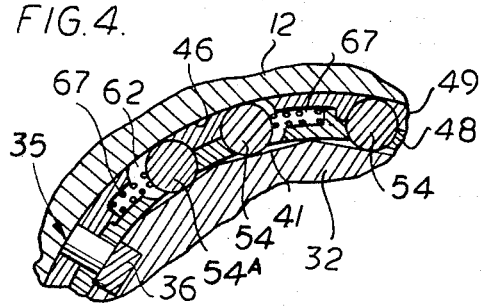

United States Patent Office 3,426,874
Patented Feb. 11, 1969

3,426,874
SELF-ENERGIZING SYNCHRONIZING CLUTCH
Lawrence M. Johnston, Jr., Fort Wayne, Ind., assignor to International Harvester Company, Chicago, Ill., a corporation of Delaware
Filed Sept. 25, 1967, Ser. No. 670,111
U.S. Cl. 192—38
Int. Cl. F16d *13/04, 15/00, 41/06*
12 Claims

ABSTRACT OF THE DISCLOSURE

A self-energizing synchronizing clutch for synchromesh transmissions utilizing the main shaft inertia to synchronize a desired gear to proper speed. Synchronization is achieved by the use of rollers between an inner race splined to the main shaft and an outer race secured to the desired gear; the rollers being controlled by a shaft ring and shifting keys actuating an inner and an outer cage for the rollers. The inner race has cam surfaces thereon so that shifting of the inner and outer cages forces the rollers upon the cam surfaces of the inner race, and the rollers are wedged between the inner and outer races by the torque of the gear.

---

The present invention relates to a synchronizing clutch and more particularly to a self-energizing synchronizing clutch for synchromesh transmissions.

Among the objects of the present invention is the provision of a synchronizing clutch which reduces the effort of shifting to engage a desired gear ratio. The clutch utilizes a series of rollers mounted in an inner cage and an outer cage between an inner race splined to the main shaft and an outer race forming a part of or secured to a gear rotatably mounted on the main shaft. The roller clutch design utilizes the main shaft inertia to synchronize a desired gear to proper speed whereas a much higher force is required on the transmission gear shift lever to synchronize through cone friction surfaces of a more conventional synchronizer design.

Another object of the present invention is the provision of a synchronizing roller clutch which is of a sufficient capacity to carry the full torque provided by the gear ratio used and, therefore, eliminates the shift effort usually required in clocking a conventional synchronizer, i.e., the breaking loss of cone surfaces to engage the clutch detent.

A further object of the present invention is the provision of a synchronizing clutch which would obtain an improved shift feel. The movement of the transmission shift lever merely places the roller clutches into actuating position which requires little or no effort and leaves the work required to synchronize the gear to the main shaft inertia. Disengagement of a gear ratio would be automatic with the main clutch release when the transmission is returned to neutral or when picking up a succeeding gear ratio.

Additional objects and advantages of my invention should be apparent to those skilled in the art from the following description when considered in connection with the accompanying drawings illustrating a preferred embodiment thereof.

In the drawings:

FIG. 3 is a vertical cross sectional view of the synchronizing clutch taken on the line 3—3 of FIG. 1.

FIG. 4 is a fragmentary or partial view of the rollers and cages of FIG. 3 shown in their positions with the gear disengaged.

FIG. 5 is a view similar to FIG. 4 but with the cages and rollers shifted so that the gear is engaged.

FIG. 6 is a view similar to FIG. 5 but with the cages returned to normal position and the gear engaged for drive only.

Figure 1:
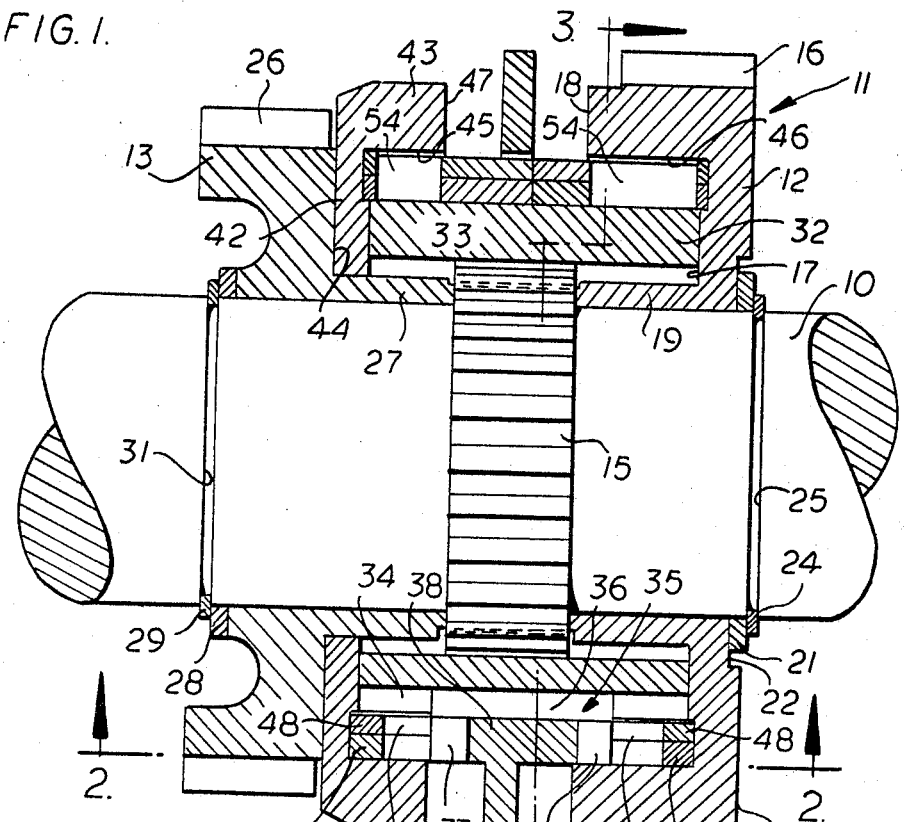
FIG. 1 is a vertical cross sectional view of the self-energizing synchronizing clutch of the present invention illustrated in connection with the second and third speed gears of a transmission.

Referring more particularly to the disclosure in the drawings wherein is shown an illustrative embodiment of the present invention, FIG. 1 discloses a main shaft 10 which is driven by the transmission gear train 11; the main shaft leading to and driving the rear wheels (not shown) of a motor vehicle. The transmission gear train 11 shown in this figure includes the second speed gear 12 and the third speed gear 13 rotatably mounted on the main shaft 10. A synchronizing clutch 14 for the gears is mounted betwen and within the gears 12 and 13.

The main shaft is provided with an annular splined portion 15 formed thereon between the gears 12 and 13 and operatively connected to the synchronizing clutch 14. The second speed gear 12 is provided with peripheral gear teeth 16 adapted to engage a corresponding gear member on a countershaft (not shown). The gear 12 is provided with an annular groove 17 opening inwardly in the inner side or face 18 of the gear and an annular internal flange 19 encompassing the main shaft 10 and abutting the edge of the splined portion 15 of the main shaft 10. A washer 21 on the main shaft 10 is received and retained in an annular groove or slot 22 in the outer face 23 of the gear 12 by a retaining ring 24 in an annular slot or groove 25 in the main shaft 10, to rotatably mount and retain the gear 12 on the main shaft 10.

The third speed gear 13 likewise is provided with peripheral gear teeth 26 to engage a suitable gear member on a counter-shaft (not shown) and an inner annular flange 27 abutting the splined portion 15 of the main shaft is retained by a retaining ring 29 received in an annular 10. A washer 28 abuts the outer face of the gear 13 and is retained by a retaining ring 29 received in an annular groove 31 in the main shaft 10 to rotatably mount and retain the gear 13 thereon.

The synchronizing clutch 14 includes an annular inner roller race 32 having internal splines 33 in meshing engagement with the splined portion 15 of the main shaft 10 to rotate therewith. The inner race 32 is provided with three equally spaced transverse slots 34 (see FIG. 3), each slot receiving a shifting key 35 having a base portion 36 received in the slot 34 and spaced upstanding end portions 37; the space between the end portions 37 accommodating a transverse depending lug 38 of a shifting ring 39 actuated by a transmission shift lever and actuating fork (not shown) of conventional design. The exterior surface of the inner race 32 is provided between the slots 34 with a plurality of flattened cam surfaces 41 (see FIGS. 3–6); four flattened cam surfaces 41 being shown between adjacent slots 34 in FIG. 3.

An outer roller race 42 (FIG. 1) is provided with a radially inwardly extending flange 43 adapted to be secured by suitable means to the inner side or face 44 of the third speed gear 13. The outer race 42 is provided with an interior circular camming surface 45 facing the exterior surface of the inner race 32. As the second speed gear 12 is larger in diameter than the third speed gear 13, the interior circular camming surface 46 is formed within the annular groove 17 without the necessity of an outer member for this gear. The shifting ring 39 is free to move between the inner faces 18 and 47 of the second speed gear 12 and third speed gear 13, respectively.

The inner race 32 is received between the gears 12 and 13 and extends into the groove 17 of gear 12 and into the groove formed between the outer race 42 and the annular flange 27 of the gear 13. Also received in this space between the gears and between the exterior surface of the inner race 32 and the circular cam surfaces 45 and 46 of the outer race 42 and the gear 12, respectively, are a pair of inner and outer roller cages 48 and 49, respectively, for each gear 12 and 13; the cages abutting at approximately the center of the inner race 32.

Figure 2:
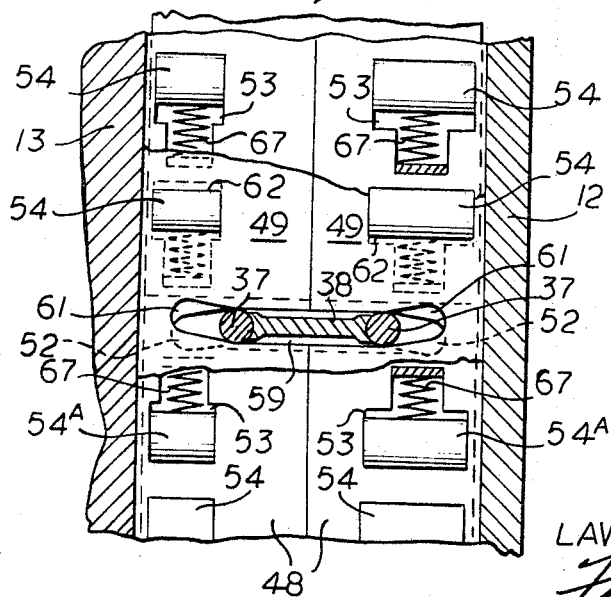
FIG. 2 is a partial cross sectional view of the synchronizing clutch taken on the line 2—2 of FIG. 1.

The inner cages 48, 48 are each provided with slots 51 (FIG. 1) extending from the abutting edges thereof for approximately one-third of the width of the cage and then angled downward at 52 as seen in FIG. 2 for and terminating in a round end at approximately two-thirds the width of the cage; the slot 51, 52 receiving one end portion 37 of a shifting key 35. The slots 51, 52 in the inner cage are provided for each key 35 as seen in FIG. 3. Also formed in the inner cage are a plurality of slots 53; the slots corresponding in position and number with the flattened cam surfaces 41 (FIGS. 3-6) on the inner race 32. Each slot receives a cylindrical roller 54 or 54ª which coacts with a cam surface 41. As seen in FIGS. 3-6, each slot 53 has curved converging walls 55 for a purpose to be described later which are complementary to the curvature of the roller 54 or 54ª.

Adjacent each slot 53 in the inner cage 48 is a groove 56 or 57 formed in the outer surface of the cage; the grooves 56 being shown as three in number between adjacent traverse slots 34 in the inner race 32 and the aligned slots 51, 52 in the cage and extending to the right of the slots 53 as shown in FIGS. 3-6. The grooves 56 are associated with the slots 53 receiving the rollers 54. The groove 57 extends to the left of the slot 53 receiving roller 54ª and is the farthest groove counterclockwise between adjacent shifting keys 35 as seen in FIG. 3. Each groove 56, 57 is perpendicular to the longitudinal axis of the adjacent slot 53, and each groove terminates in an upstanding abutment 58.

Outer cages 49, 49 for the two gears are mounted in sliding contact with their respective inner cages 48, 48, and each is provided with a series of slots 59 aligned with the slots 51 of the inner cages 48, 48 and extending outward from the abutting edges of the cages. The slots 59 terminate in angularly disposed end portions 61 similar to the angled portions 52, but angled in the opposite direction; upward as seen in FIG. 2. Thus, shifting of the shifting keys 35 toward a gear will cause the inner and outer cages 48 and 49, respectively, to rotate in opposite directions as will be described later.

The outer cages 49, 49 are each provided with a plurality of axially oriented slots 62 (FIGS. 2 and 3) aligned with slots 53 of the corresponding inner cage 48 and having curved converging walls 63 complementary to and receiving the cylindrical rollers 54. Each slot 62 has an adjacent groove 64 or 65 perpendicular thereto and terminating in an inwardly extending abutment 66. The three grooves 64 correspond to the grooves 56 of the inner cage 48, and each groove receives the corresponding abutment 58 of the inner cage therein. The fourth groove 65 also corresponding to the groove 57 of the inner cage except that the groove 57 of inner cage 48 receives the abutment 66 of groove 65 in the outer cage 49. A compression spring 67 is received in each pair of corresponding and facing grooves 56, 64 and 57, 65 having one end abutting the abutment 58 or 66 and the opposite end abutting a roller 54 or 54ª.

Now considering the operation of the self-energizing synchronizer, FIGS. 3-6 disclose the various stages of engagement of the synchronizer for power up-shift or power down-shift. For power up-shift FIGS. 3 and 4 show the cages 48 and 49 and the rollers 54, 54ª in their normal position with the rollers 54, 54ª rotating with the inner race 32 free of the mainshaft driving gear, which gear can be either the second speed gear 12 or the third speed gear 13. To engage either the second gear 12 or the third gear 13 with the mainshaft 10, the shifting key 35 is shifted through a shifting fork and the shift ring 39 toward the desired gear.

As shown in FIGS. 3-6, the second speed gear 12 is being engaged, and the shifting of the end portion 37 of the key 35 into the angularly disposed slot portions 52, 61 of the inner and outer cages 48, 49, respectively, causes the outer cage 49 to rotate in a clockwise direction and the inner cage 48 to rotate in a counterclockwise direction as seen by the arrows of FIG. 5. As this shifting of the cages 48 and 49 occurs, the torque of the second gear 12 forces the rollers 54, 54ª up on the cam surfaces 41 of the inner race 32 to engage the gear 12 with the mainshaft 10 through the curved surface 46 of the outer race formed on the gear 12 and the cam surfaces 41 on the inner race 32 which is splined to the mainshaft 10. As seen in FIG. 5, the rollers 54 transmit drive torque to the inner race 32 while the rollers 54ª transmit coast torque.

In FIG. 6, the gear 12 is engaged for drive only as the shifting key 35 is moved back to its neutral position causing the inner and outer cages 48 and 49 to return to their normal positions, as shown by the arrows in FIG. 6, once the driving engagement has been attained. When the cages return to their normal positions, the rollers 54a also return to their normal position since no torque is being transmitted through them. The rollers 54 are held in driving position by the wedging action of the torque being transmitted by the gear 12 to the mainsnaft 10.

When the gear 12 is to be disengaged and the gear 13 to be engaged, the shift ring 39 moves the shift key 35 toward the third gear 13 to cause relative rotation of the cages 48 ant 49 for that gear. Once the next gear 13 is engaged, the torque transmitted by the rollers 54 for the gear 12 is relieved and the springs 67 return the rollers 54 to their original position.

Where there is a power down-shift from third to second gear, the operation is the same except that the mainsaft 10 becomes the driving member in the synchronizer and the shifting of the inner and outer cages 48 and 49 causes the rollers 54, 54a to engage the cam surfaces 41, and when the shift key 35 is returned to its neutral position as in FIG. 6, the rollers 54a remain in driving position and the rollers 54 return to their original position. When the gear is disengaged, the rollers 54a are returned to their original position by the springs 67 (see FIG. 4).

While the self-energizing synchronizing clutch has been shown and described as being advantageously applicable to the second speed and third speed gears of a synchromesh transmission, it is not my desire or intent to unnecessarily limit the scope of the utility of the improved features by virtue of this illustrative embodiment.

Having thus disclosed my invention, I claim:

1. A self-energizing synchronizing clutch for selectively clutching axially spaced gears to a shaft upon which said gears are journalled, comprising an inner race surrounding and splined to the shaft intermediate said gears, cam means on said inner race, an outer race operatively connected to each gear, said inner and outer races forming a generally annular space therebetween concentric with said shaft, a plurality of rollers in the space between the inner and outer races, an inner and an outer cage having generally aligned slots therein to receive and space said rollers, and means to actuate said rollers to cause wedging between said outer race and said cam means of the inner race to cause the gear and shaft to rotate together.

2. A self-energizing synchronizing clutch as set forth in claim 1, in which an inner and an outer cage and a plurality of rollers are provided for each gear between the outer race operatively connected to the gear and the common inner race.

3. A self-energizing synchronizing clutch as set forth in claim 1, in which said cam means includes a plurality of flattened cam surfaces formed on the periphery of the inner race.

4. A self-energizing synchronizing clutch as set forth in claim 3, in which said means to actuate said rollers includes a plurality of shifting keys, a shift ring actuating said keys, said inner race having axially extending slots in the periphery thereof to receive the shifting keys for reciprocatory movement, each key having actuating means thereon engageable with said inner and outer cages.

5. A self-energizing synchronizing clutch as set forth in claim 4, in which said shifting keys each include a base portion received in the slot in the inner race and a pair of spaced end portions projecting up from the base, and the inner and outer cages have aligned slots receiving the upwardly projecting end portions.

6. A self-energizing synchronizing clutch as set forth in claim 4, in which each cage has a slot therein with an angularly disposed closed end corresponding to each shifting key, the angularly disposed closed end of the slots in the inner cage being oppositely positioned to the angularly disposed closed end of the slots of the outer cage so that movement of the shifting key in the aligned slots of the inner and outer cages causes opposite rotation of the cages due to the oppositely disposed angular ends of the aligned slots.

7. A self-energizing synchronizing clutch as set forth in claim 6, in which the relative movement of the cages causes the rollers to wedge on the cam surfaces of the inner race.

8. A self-energizing synchronizing clutch as set forth in claim 6, in which a plurality of rollers are positioned between adjacent shifting keys, at least one of said rollers providing coast torque and the other rollers providing drive torque.

9. A self-energizing synchronizing clutch as set forth in claim 8, in which the drive torque rollers engage the came surfaces on the inner race upon movement of the shifting key during a power up-shift, and the coast torque rollers engage the cam surfaces during a power down-shift, said shifting key being returned to its neutral position upon clutch engagement but the rollers remain engaged with the cam surfaces until the next gear is engaged, and spring means to bias said rollers to their inactive position.

10. A self-energizing synchronizing clutch as set forth in claim 6, in which each inner and outer cage has spaced slots with coverging curved edges complementary to the rollers, the edges of each slot being spaced a distance greater than the diameter of the roller, a groove formed in the facing surfaces of the inner and outer cages perpendicular to the axis of each slot and terminating in an abutment, and spring means in the passage formed by the facing slots engaging the abutments and biasing the rollers to normal inactive position.

11. A self-energizing synchronizing clutch as set forth in claim 10, in which one of said rollers positioned between adjacent shifting keys is a coast torque roller and is positioned adjacent a shifting key, said groove for the slot receiving the coast torque roller extending toward the adjacent shifting key, the remaining rollers being drive torque rollers and being positioned between the coast torque roller and the next adjacent shifting key, the grooves for the slots receiving the drive torque rollers extending in a direction opposite to the direction of the groove for the coast torque roller.

12. A self-energizing synchronizing clutch as set forth in claim 11, in which the abutments extend outward from the inner cage and into the grooves on the outer cage for the drive torque rollers, and the abutments on the outer cage extend inward and are positioned behind the inner cage abutments for the drive torque rollers, and for the coast torque rollers the outer cage abutments extend into the groove on the inner cage and in front of the inner cage abutment therefor.

References Cited
UNITED STATES PATENTS
2,061,288  11/1936  Murray _____ 192—48.92

CARLTON R. CROYLE, *Primary Examiner.*

ALLAN D. HERRMANN, *Assistant Examiner.*

U.S. Cl. X.R.

192—45; 48.92